US008960982B2

(12) United States Patent  (10) Patent No.: US 8,960,982 B2
Hsu et al.  (45) Date of Patent: Feb. 24, 2015

(54) ELECTRONIC APPARATUS HAVING A DISPLAY UNIT

(71) Applicants: Chun-Chi Hsu, Hsin-Chu (TW); Chun-Chung Hsiao, Hsin-Chu (TW)

(72) Inventors: Chun-Chi Hsu, Hsin-Chu (TW); Chun-Chung Hsiao, Hsin-Chu (TW)

(73) Assignee: Young Lighting Technology Inc., Hsin-chu (TW)

( * ) Notice: Subject to any disclaimer, the term of this patent is extended or adjusted under 35 U.S.C. 154(b) by 6 days.

(21) Appl. No.: 13/912,202

(22) Filed: Jun. 7, 2013

(65) Prior Publication Data

US 2014/0016346 A1  Jan. 16, 2014

(30) Foreign Application Priority Data

Jul. 10, 2012  (TW) .............................. 101124806 A

(51) Int. Cl.
*F21V 8/00* (2006.01)
*H05K 5/00* (2006.01)
*F21V 33/00* (2006.01)
*H04M 1/02* (2006.01)

(52) U.S. Cl.
CPC .......... *H05K 5/0017* (2013.01); *F21V 33/0012* (2013.01); *G02B 6/005* (2013.01); *H04M 1/0266* (2013.01)
USPC ....................................... 362/606; 362/249.02

(58) Field of Classification Search
USPC ..................... 362/606, 249.02, 607, 616, 293
See application file for complete search history.

(56) References Cited

FOREIGN PATENT DOCUMENTS

| CN | 1916704 | 2/2007 |
|---|---|---|
| CN | 101398543 | 4/2009 |
| CN | 102117109 | 7/2011 |
| TW | 200302941 | 8/2003 |
| TW | 575767 | 2/2004 |
| TW | 201133088 | 10/2011 |
| TW | 201135327 | 10/2011 |

OTHER PUBLICATIONS

"Office Action of Taiwan Counterpart Application", issued on Oct. 20, 2014, p. 1-p. 8, in which the listed references were cited.

*Primary Examiner* — Joseph L Williams
(74) *Attorney, Agent, or Firm* — Jianq Chyun IP Office

(57) ABSTRACT

An electronic apparatus including a back cover, a frame body, a transparent plate, and a display unit is provided. The frame body is disposed on the back cover and has a first supporting surface and a second supporting surface. The transparent plate is supported on the first supporting surface. The display unit is supported on the second supporting surface and adhered to the transparent plate, and the display unit is held between the second supporting surface and the transparent plate.

21 Claims, 4 Drawing Sheets

ELECTRONIC APPARATUS HAVING A DISPLAY UNIT

CROSS-REFERENCE TO RELATED APPLICATION

This application claims the priority benefit of Taiwan application serial no. 101124806, filed on Jul. 10, 2012. The entirety of the above-mentioned patent application is hereby incorporated by reference herein and made a part of this specification.

BACKGROUND OF THE INVENTION

1. Field of the Invention

The invention relates to an electronic apparatus. More particularly, the invention relates to an electronic apparatus having a display unit.

2. Description of Related Art

With advancements in the semiconductor industry and relevant electronic industries, digital devices such as mobile phones, digital cameras, digital video cameras, notebooks, and desktop computers have progressed to meet requirements of easy operation, multi-functionality, and attractive exterior designs. When using the products as described above, suitable display screens may be used. The display screens of the aforementioned products may facilitate various operations for the user. Among the display screens, LCDs (liquid crystal displays) have become the mainstream products in the market.

In conventional LCDs, an external side of a display panel usually includes a transparent plate, such as a cover glass, so as to protect the display panel. The display panel and the transparent plate could be fixed together through an adhesive method. In order to prevent the adhesive between the display panel and the transparent plate from interfering with display quality, usually an optical adhesive with a high transmittance coefficient, such as an optical clear adhesive, is used for adhesion. Since the adhesiveness of an optical adhesive is less when compared to general double-sided tape, thus when the transparent plate deforms, an ungluing phenomenon is likely to happen between the display panel and the transparent plate, which affects the display quality of the LCD.

China Publication Number CN102117109A discloses a portable calculating equipment, wherein a display frame includes a plurality of inserted objects, and the inserted objects provide support for the structure. China Publication Number CN101398543A discloses an LCD device that uses a fixer to support the LCD panel. A gap is between the LCD panel and a protection plate. Taiwan Patent Number TW575767 discloses an LCD that uses a locking element to fix a position of an LCD panel.

SUMMARY OF THE INVENTION

The invention provides an electronic apparatus, adapted to prevent an ungluing phenomenon between a display unit and a transparent plate.

The invention provides an electronic apparatus, adapted to prevent an ungluing phenomenon from occurring between a display unit and a transparent plate, and further creating bubbles.

Other objects and advantages of the present invention may be further illustrated by the technical features broadly embodied and described as follows.

In order to achieve one or a portion of or all of the objects or other objects, an embodiment of the invention is directed to an electronic apparatus, including a back cover, a frame body, a transparent plate, and a display unit. The frame body is disposed on the back cover and has a first supporting surface and a second supporting surface. The transparent plate is supported on the first supporting surface. The display unit is supported on the second supporting surface and adhered to the transparent plate, and the display unit is held between the second supporting surface and the transparent plate.

In an embodiment, the frame body includes a main body and a first supporting portion. The main body includes an opening, wherein the first supporting surface is located on the main body, and the display unit is located in the opening. The first supporting portion is connected to the main body and located in the opening. The second supporting surface is located on the first supporting portion.

In an embodiment, the first supporting portion extends along an inner edge of the opening to be a surrounding structure.

In an embodiment, the first supporting portion includes a plurality of sections separated from each other, wherein each section is connected to the inner edge of the opening.

In an embodiment, the frame body is integrally formed.

In an embodiment, the main body of the frame body and the first supporting portion make up a stair structure.

In an embodiment, the display unit is a display panel.

In an embodiment, the electronic apparatus includes a backlight module. The backlight module is disposed on the back cover, and the backlight module is located between the back cover and the frame body.

In an embodiment, the frame body includes a third supporting surface. The backlight module is supported on the third supporting surface, and the display panel is located between the backlight module and the transparent plate.

In an embodiment, the frame body further includes a second supporting portion, connected to the main body and located in the opening. The third supporting surface is located on the second supporting portion.

In an embodiment, the frame body is integrally formed, and the main body of the frame body and the first supporting portion and the second supporting portion make up a stair structure.

In an embodiment, the display unit is a display module and includes a display panel and a backlight module. The display panel is adhered to the transparent plate. The backlight module is assembled to the display panel and supported on the second supporting surface.

In an embodiment, the backlight module includes a light guide plate and a plurality of optical films.

In an embodiment, the backlight module includes a mold frame, wherein the mold frame supports the light guide plate and on the optical films.

In an embodiment, the display unit includes a back surface and a polarizer. The back surface is supported on the second supporting surface, and the polarizer is disposed on the back surface and surrounded by the first supporting portion.

In an embodiment, the frame body is adhered to the back cover.

In an embodiment, the transparent plate is adhered to the first supporting surface.

Based on the above, the embodiments of the invention at least include one of the following advantages. The frame body of the electronic apparatus not only includes a first supporting surface for supporting the transparent plate, the frame body also includes a second supporting surface for supporting the display unit. This way, the display unit could be held between the second supporting surface and the transparent plate. Since the display unit is stably fixed between the second supporting surface and the transparent plate, thus when the transparent plate deforms, the relative positions between the transparent plate and the display unit could be fixed through the support of the frame body. This way, an ungluing phenomenon could be prevented between the display unit and the transparent plate, and display quality will not be affected. In addition, in other embodiments of the invention, the frame body of the electronic apparatus could further include a third supporting surface, adapted to support a backlight module.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the teens "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
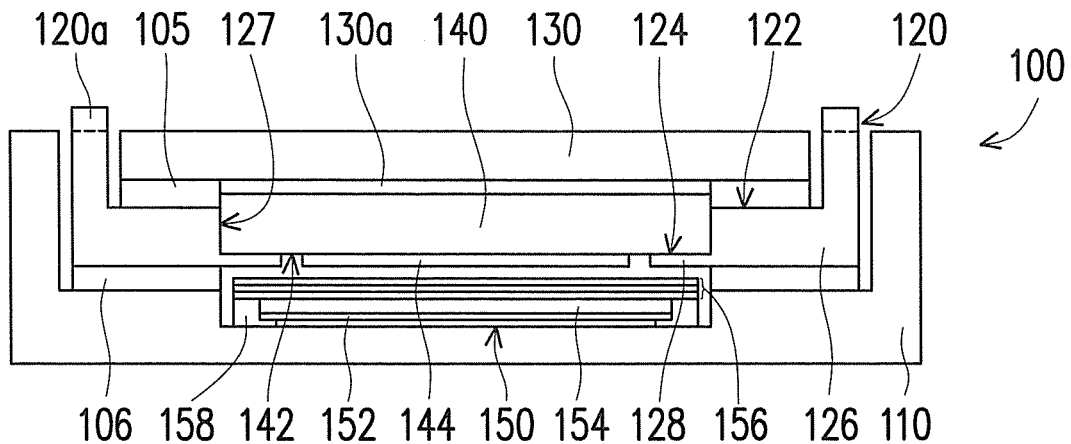
FIG. 1A is a schematic cross-sectional view of an electronic apparatus according to an embodiment of the invention.
Figure 1B:
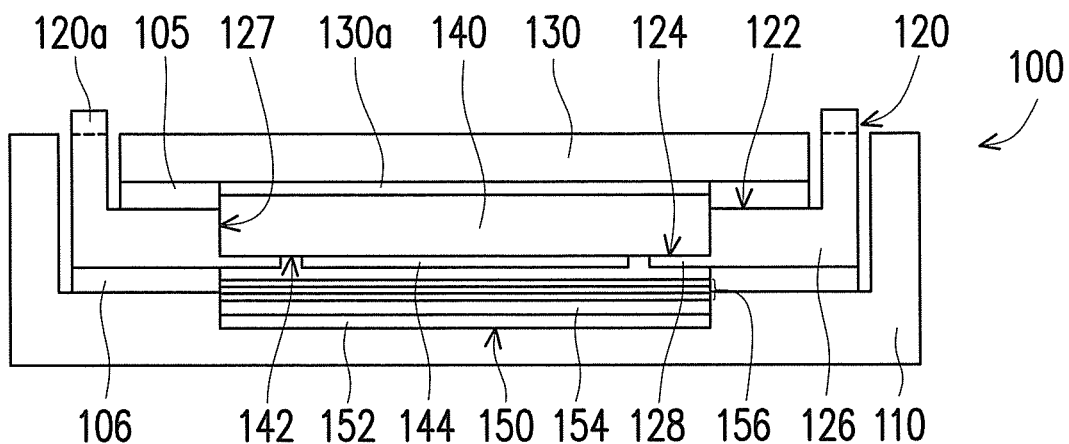
FIG. 1B is a schematic cross-sectional view of an electronic apparatus according to another embodiment of the invention.

FIG. 1A is a schematic cross-sectional view of an electronic apparatus according to an embodiment of the invention. FIG. 1B is a schematic cross-sectional view of an electronic apparatus according to another embodiment of the invention. Referring to FIG. 1A and FIG. 1B, an electronic apparatus 100 may be a display of notebook computer, but the invention is not limited thereto. In FIG. 1A or FIG. 1B, the electronic apparatus 100 includes a back cover 110, a frame body 120, a transparent plate 130, and a display unit 140. The frame body 120 is disposed on the back cover 110 and has a first supporting surface 122 and a second supporting surface 124. The transparent plate 130 is, for example, a glass plate, and is supported on the first supporting surface 122. The display unit 140 is supported on the second supporting surface 124, and is adhered to the transparent plate 130 through an optical adhesive 130a. The display unit 140 is held between the second supporting surface 124 and the transparent plate 130.

In the aforementioned configuration, the frame body 120 of the electronic apparatus 100 not only includes the first supporting surface 122 for supporting the transparent plate 130, the frame body 120 also includes the second supporting surface 124 for supporting the display unit 140. This way, the display unit 140 could be held between the second supporting surface 124 and the transparent plate 130. Since the display unit 140 is stably fixed between the second supporting surface 124 and the transparent plate 130, thus when the transparent plate 130 deforms, the relative positions between the transparent plate 130 and the display unit 140 could be fixed through the support of the frame body 120. This way, an ungluing phenomenon could be prevented between the display unit 140 and the transparent plate 130, and display quality will not be affected.

Figure 2A:
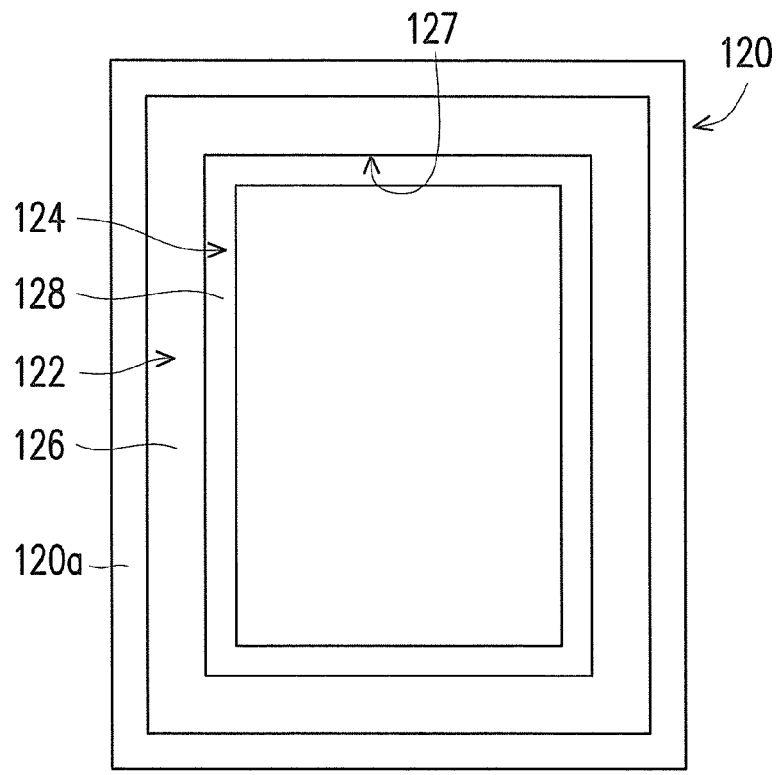
FIG. 2A is a top view of a frame body of FIG. 1A.

FIG. 2A is a top view of a frame body of FIG. 1A. Referring to FIG. 1A and FIG. 2A, in the embodiment, the frame body 120 includes a main body 126 and a first supporting portion 128. The main body 126 includes an opening 127. The display unit 140 is located in the opening 127. The first supporting portion 128 is connected to the main body 126 and located in the opening 127. The main body 126 and the first supporting portion 128 make up a stair structure. The first supporting surface 122 is located on the main body 126, and the second supporting surface 124 is located on the first supporting portion 128. In the embodiment, the first supporting structure 128 extends along an inner edge of the opening 127, and is a surrounding structure. In detail, the first supporting portion 128 of the surrounding structure includes a stronger structure so as to support the display unit 140.

The main body 126 of the frame body 120 of the embodiment and the first supporting portion 128 are integrally formed. The materials of the main body 126 and the first supporting portion 128 are, for example, plastic, and are simultaneously fabricated through an injection molding process. The materials of the main body 126 and the first supporting portion 128 could also be rubber or other suitable materials. The invention is not limited thereto. When the material of the frame body 120 is a flexible material such as plastic or rubber, the frame body 120 is a buffer element, and could act as a buffer between the hard material (such as glass) of the transparent plate 130 and the hard material (such as metal) of the back cover 110. In addition, when the material of the frame body 120 is plastic, a dual injection molding process could be used to form a buffer portion 120a on the frame body 120 as seen in FIG. 1A. The buffer portion 120a protrudes from the surface of the electronic apparatus 100, so as to buffer the electronic apparatus 100 from colliding with other components. For example, if the electronic apparatus 100 is a display of a notebook computer, then the buffer portion 120a could buffer the electronic apparatus 100 from the colliding force generated when closing the main body of the notebook computer.

As seen in FIG. 1A, the frame body 120 is disposed on the back cover 110, and is adhered to the transparent plate 130 through, for example, double sided tape 105. That is to say, the transparent plate 130 is adhered to the first supporting surface 122 of the frame body 120 through the double sided tape 105. The material of the back cover 110 is, for example, a metal material. The frame body 120 is, for example, adhered to the back cover 110 through a double sided tape 106. In other embodiments, the frame body 120, the back cover 110, and the transparent plate 130 could be fixed to each other through other suitable methods. The invention is not limited thereto.

In the embodiment, a polarizer 144 is disposed on a back surface 142 of the display unit 140. The back surface 142 of the display unit 140 is supported on the second supporting surface 124 of the frame body 120. The polarizer 144 is surrounded by the first supporting portion 128 of the frame body 120. In other embodiments, the dimensions of the polarizer 144 and the dimensions of the first supporting portion 128 could be suitably changed so that the polarizer 144 is supported on the first supporting portion 128. The invention is not limited thereto.

Figure 2B:
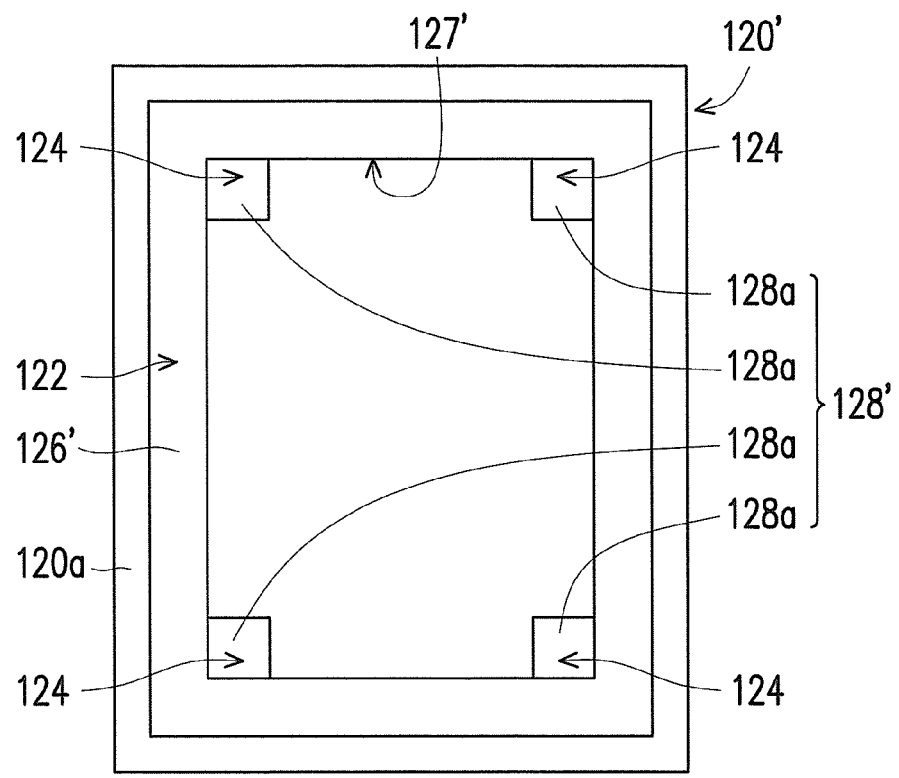
FIG. 2B is a top view of a frame body of another embodiment of the invention.

FIG. 2B is a top view of a frame body of another embodiment of the invention. The difference between the frame body 120' of FIG. 2B and the frame body 120 of FIG. 2A is that the first supporting portion 128' of the frame body 120' includes a plurality of sections 128a (four are shown, but the invention is not limited thereto) separated from each other, wherein each section 128a is connected to the inner edge of the opening 127' of the main body 126'. In detail, the first supporting portion 128' with the sections 128a separated from each other has a strong enough structure to support the display unit 140, and saves material at the same time. In the embodiment of FIG. 2B, the sections 128a of the first supporting portion 128' are respectively disposed at the four corners of the opening 127'. However, the embodiment is not limited thereto. In other embodiments, the sections 128a could be located at other suitable locations of the opening 127'.

In the embodiment of FIG. 1A and FIG. 1B, the display unit 140 is a display panel. The electronic apparatus 100 further includes a backlight module 150. The backlight module 150 is disposed on the back cover 110, and is not supported by the frame body 120. The bottom of the display panel is supported on the second supporting surface 124 of the frame body 120. The backlight module 150 is located between the back cover 110 and the frame body 120. In detail, the backlight module 150 is located between the back cover 110 and the first supporting portion 128 of the frame body 120. In addition, in the embodiment of FIG. 1A, the backlight module 150 further includes a reflector 152, a light guide plate 154, an optical film module 156, and a mold frame 158. The optical film module 156 is, for example, a diffuser, a brightness enhancement film, or other suitable optical films. The mold frame 158 is adapted to support the reflector 152, the light guide plate 154, and the optical film module 156. Thus, the back cover 110 supports the mold frame 158 so as to support the reflector 152, the light guide plate 154, and the optical film module 156. However, in the embodiment of FIG. 1B, the backlight module 150 does not include the mold frame 158. A structure similar to the mold frame is formed on the back cover 110, or the back cover 110 has a mold frame function. The reflector 152, the light guide plate 154, and the optical film module 156 are directly supported on the back cover 110. However, the invention is not limited thereto. The following figures are exemplary descriptions.

Figure 3A:
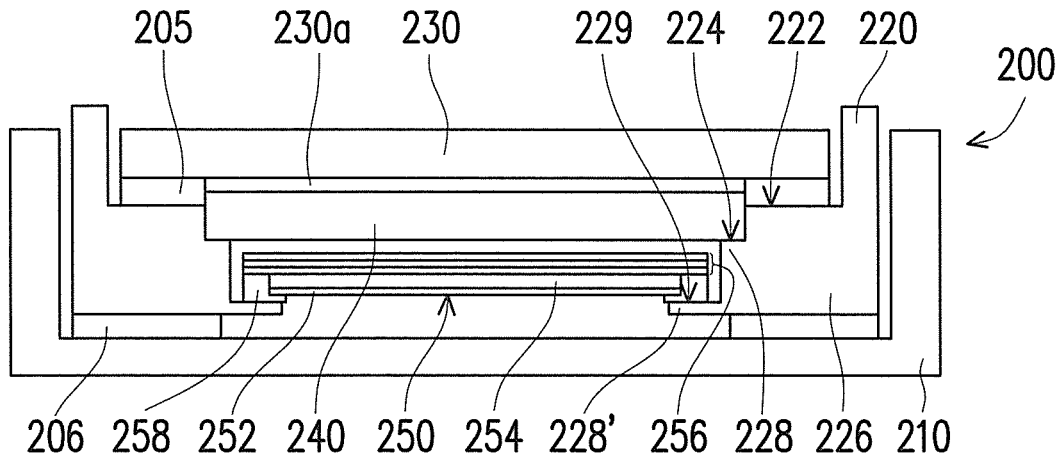
FIG. 3A is a schematic cross-sectional view of an electronic apparatus according to another embodiment of the invention.
Figure 3B:
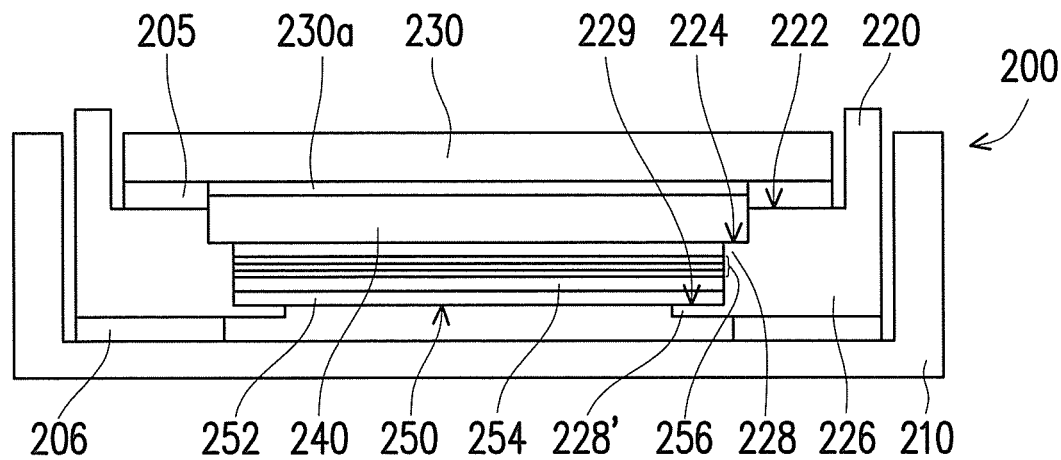
FIG. 3B is a schematic cross-sectional view of an electronic apparatus according to another embodiment of the invention.

FIG. 3A is a schematic cross-sectional view of an electronic apparatus according to another embodiment of the invention. FIG. 3B is a schematic cross-sectional view of an electronic apparatus according to another embodiment of the invention. Referring to FIG. 3A and FIG. 3B, in the electronic apparatus 200 of the embodiment, the transparent plate 230 is adhered to the first supporting surface 222 of the frame body 220 through a double sided tape 205. The frame body 220 is, for example, adhered to the back cover 210 through a double sided tape 206. The display unit 240 is supported on the second supporting surface 224 and is adhered to the transparent plate 230 through an optical adhesive 230a. The difference between the electronic apparatus 100 of FIG. 1A and FIG. 1B is that the frame body 220 not only includes the first supporting surface 222 for supporting the transparent plate 230, and the second supporting surface 224 for supporting the display unit 240 (for example a display panel), the frame body 220 also includes a third supporting surface 229 for supporting the backlight module 250. Referring to FIG. 3A and FIG. 3B, the frame body 220 of the embodiment includes a first supporting portion 228 and a second supporting portion 228'. The second supporting surface 224 is located on the first supporting portion 228. The third supporting surface 229 is located on the second supporting portion 228'. The main body 226 of the frame body 220 and the first supporting portion 228 and the second supporting portion 228' are integrally formed and make up a stair structure. The backlight module 250 is supported by the third supporting surface 229 of the frame body 220 and is not supported by the back cover 210. The backlight module 250 is located between the frame body 220 and the display unit 240. In detail, the backlight module 250 is located between the second supporting portion 228' of the frame body 220 and the display unit 240. In addition, in the embodiment of FIG. 3A, the backlight module 250 further includes a reflector 252, a light guide plate 254, an optical film module 256, and a mold frame 258. The mold frame 258 is adapted to support the reflector 252, the light guide plate 254, and the optical film module 256. Thus, the second supporting portion 228' of the frame body 220 supports the mold frame 258 so as to support the reflector 252, the light guide plate 254, and the optical film module 256. However, in the embodiment of FIG. 3B, the backlight module 250 does not include the mold frame 258. A structure similar to the mold frame is foamed on the frame body 220, or the frame body 220 has a mold frame function. The reflector 252, the light guide plate 254, and the optical film module 256 are directly supported on the frame body 220. That is to say, the reflector 252, the light guide plate 254, and the optical film module 256 are sequentially disposed on the second supporting portion 228' of the frame body 220. In FIG. 3A or FIG. 3B, a gap exists between the second supporting portion 228' of the frame body 220 and the back cover 210. However, the invention is not limited thereto. In other embodiments, the second supporting portion 228' could extend downwards to directly lean on the back cover 210.

Figure 4A:
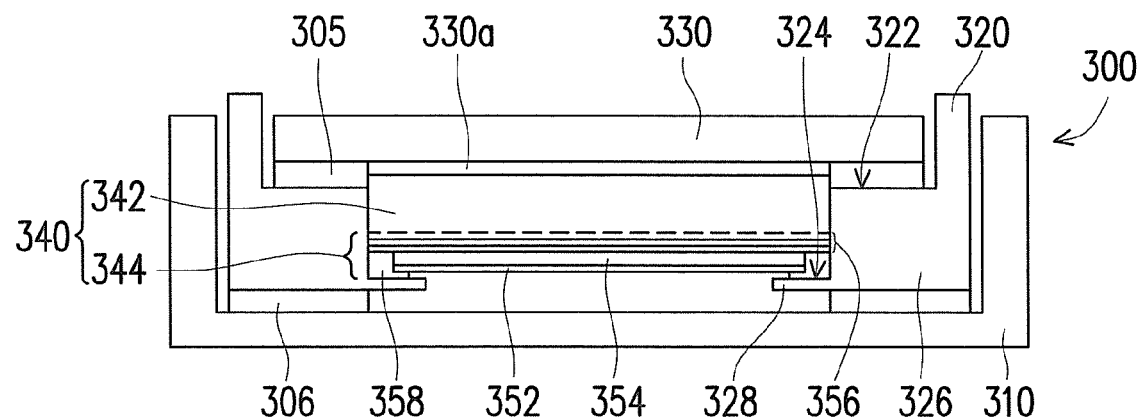
FIG. 4A is a schematic cross-sectional view of an electronic apparatus according to another embodiment of the invention.
Figure 4B:
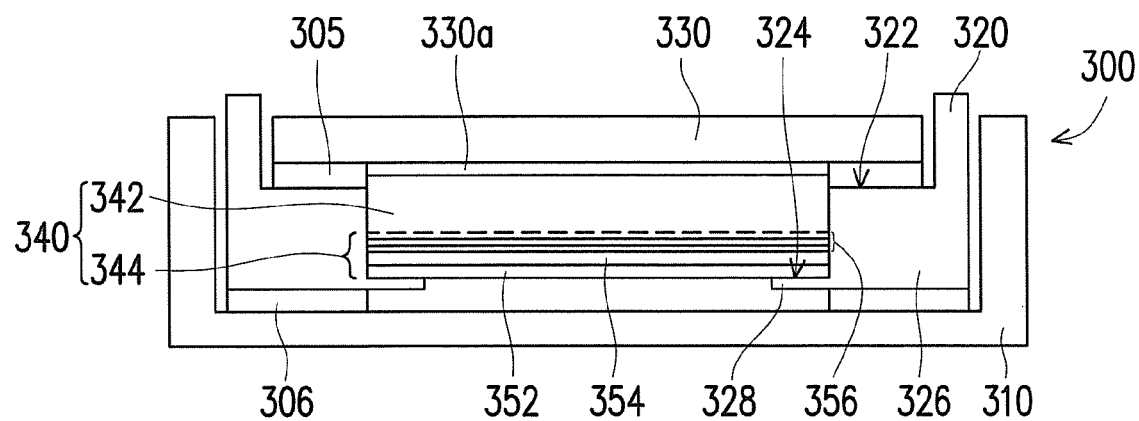
FIG. 4B is a schematic cross-sectional view of an electronic apparatus according to another embodiment of the invention.

FIG. 4A is a schematic cross-sectional view of an electronic apparatus according to another embodiment of the invention. FIG. 4B is a schematic cross-sectional view of an electronic apparatus according to another embodiment of the invention. Referring to FIG. 4A and FIG. 4B, in the embodiment, the display unit 340 of the electronic apparatus 300 is a display module. The display module includes a display panel 342 and a backlight module 344. The transparent plate 330 is, for example, adhered to the first supporting surface 322 of the frame body 320 through a double sided tape 305. The main body 326 of the frame body 320 of the embodiment and the first supporting portion 328 are integrally formed. The frame body 320 is, for example, adhered to the back cover 310 through a double sided tape 306. The display panel 342 is, for example, adhered to the transparent plate 330 through an optical adhesive 330a. The backlight module 344 is assembled to the display panel 342 and supported on the second supporting surface 324 of the frame body 320. In the embodiment, the display panel 342 and the backlight module 344 are assembled to become a display module, and are held together between the transparent plate 330 and the second supporting surface 324 of the frame body 320. This way, the display panel 342 could be stably bonded with the transparent plate 330. The backlight module 344 is supported by the second supporting surface 324 of the frame body 320, and is not supported by the back cover 310. The backlight module 344 is located between the frame body 320 and the display panel 342. In detail, the backlight module 344 is located between the first supporting surface 328 of the frame body 320 and the display panel 342. In addition, in the embodiment of FIG. 4A, the backlight module 344 further includes a reflector 352, a light guide plate 354, an optical film module 356, and a mold frame 358. The mold frame 358 is adapted to support the reflector 352, the light guide plate 354, and the optical film module 356. Thus, the first supporting portion 328 of the frame body 320 supports the mold frame 358 so as to support the reflector 352, the light guide plate 354, and the optical film module 356. However, in the embodiment of FIG. 4B, the backlight module 344 does not include the mold frame 358. A structure similar to the mold frame is formed on the frame body 320, or the frame body 320 has a mold frame function. The reflector 352, the light guide plate 354, and the optical film module 356 are directly supported on the frame body 320. That is to say, the reflector 352, the light guide plate 354, and the optical film module 356 are sequentially disposed on the first supporting portion 328 of the frame body 320. In the embodiment of FIG. 4A or in FIG. 4B, a gap exists between the first supporting portion 328 of the frame body 320 and the back cover 310. However, the invention is not limited thereto. In other embodiments, the first supporting portion 328 could extend downwards to directly lean on the back cover 310.

To sum up, the embodiments of the invention at least include one of the following advantages. The frame body of the electronic apparatus not only includes a first supporting surface for supporting the transparent plate, the frame body also includes a second supporting surface for supporting the display unit. This way, the display unit could be held between the second supporting surface and the transparent plate. Since the display unit is stably fixed between the second supporting surface and the transparent plate, thus when the transparent plate deforms, the relative positions between the transparent plate and the display unit could be fixed through the support of the frame body. This way, an ungluing phenomenon could be prevented between the display unit and the transparent plate, and display quality will not be affected. In addition, in other embodiments of the invention, the frame body of the electronic apparatus could further include a third supporting surface, adapted to support a backlight module.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:
1. An electronic apparatus, comprising:
a back cover;
a frame body, disposed on the back cover and having a first supporting surface and a second supporting surface;
a transparent plate, supported on the first supporting surface; and
a display unit, supported on the second supporting surface and adhered to the transparent plate, wherein the display unit is held between the second supporting surface and the transparent plate.
2. The electronic apparatus as claimed in claim 1, wherein the frame body comprises:

a main body, including an opening, wherein the first supporting surface is located on the main body, and the display unit is located in the opening; and a first supporting portion, connected to the main body and located in the opening, wherein the second supporting surface is located on the first supporting portion.

3. The electronic apparatus as claimed in claim 2, wherein the first supporting portion extends along an inner edge of the opening, and is a surrounding structure.

4. The electronic apparatus as claimed in claim 2, wherein the first supporting portion includes a plurality of sections separated from each other, wherein each section is connected to the inner edge of the opening.

5. The electronic apparatus as claimed in claim 1, wherein the frame body is integrally formed.

6. The electronic apparatus as claimed in claim 2, wherein the frame body is integrally formed and the main body and the first supporting portion form a stair structure.

7. The electronic apparatus as claimed in claim 1, wherein the display unit is a display panel.

8. The electronic apparatus as claimed in claim 7, further comprising a backlight module, disposed on the back cover, wherein the backlight module is located between the back cover and the frame body.

9. The electronic apparatus as claimed in claim 8, wherein the backlight module comprises a light guide plate and a plurality of optical films.

10. The electronic apparatus as claimed in claim 9, wherein the backlight module further comprises a mold frame, wherein the mold frame supports the light guide plate and the optical films.

11. The electronic apparatus as claimed in claim 7, further comprising a backlight module, wherein the frame body comprises a third supporting surface, wherein the backlight module is supported on the third supporting surface, and the display panel is located between the backlight module and the transparent plate.

12. The electronic apparatus as claimed in claim 11, wherein the frame body comprises:

a main body, including an opening, wherein the first supporting surface is located on the main body, and the display unit is located in the opening;

a first supporting portion, connected to the main body and located in the opening, wherein the second supporting surface is located on the first supporting portion; and a second supporting portion, connected to the main body and located in the opening, wherein the third supporting surface is located on the second supporting portion.

13. The electronic apparatus as claimed in claim 12, wherein the frame body is integrally formed, and the main body and the first supporting portion and the second supporting portion form a stair structure.

14. The electronic apparatus as claimed in claim 11, wherein the backlight module comprises a light guide plate and a plurality of optical films.

15. The electronic apparatus as claimed in claim 14, wherein the backlight module further comprises a mold frame, wherein the mold frame supports the light guide plate and the optical films.

16. The electronic apparatus as claimed in claim 1, wherein the display unit is a display module, comprising:

a display panel, adhered to the transparent plate; and a backlight module, assembled to the display panel and supported on the second supporting surface.

17. The electronic apparatus as claimed in claim 16, wherein the backlight module comprises a light guide plate and a plurality of optical films.

18. The electronic apparatus as claimed in claim 17, wherein the backlight module further comprises a mold frame, wherein the mold frame supports the light guide plate and the optical films.

19. The electronic apparatus as claimed in claim 2, wherein the display unit includes a back surface and a polarizer, wherein the back surface is supported on the second supporting surface, and the polarizer is disposed on the back surface and surrounded by the first supporting portion.

20. The electronic apparatus as claimed in claim 1, wherein the frame body is adhered to the back cover.

21. The electronic apparatus as claimed in claim 1, wherein the transparent plate is adhered to the first supporting surface.

* * * * *